US011042689B2

(12) United States Patent
Carter et al.

(10) Patent No.: US 11,042,689 B2
(45) Date of Patent: Jun. 22, 2021

(54) GENERATING A DOCUMENT PREVIEW

(71) Applicant: International Business Machines Corporation, Armonk, NY (US)

(72) Inventors: Bernadette A. Carter, Raleigh, NC (US); John Girata, Jr., Raleigh, NC (US); Derek Richard, San Francisco, CA (US); Joshua M. Small, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 14/731,516

(22) Filed: Jun. 5, 2015

(65) Prior Publication Data

US 2016/0110316 A1    Apr. 21, 2016

Related U.S. Application Data

(63) Continuation of application No. 14/515,137, filed on Oct. 15, 2014.

(51) Int. Cl.
*G06F 40/106*    (2020.01)
*G06F 16/38*    (2019.01)
*G06F 16/176*    (2019.01)
*G06F 40/166*    (2020.01)
*G06F 40/205*    (2020.01)
(Continued)

(52) U.S. Cl.
CPC .......... *G06F 40/106* (2020.01); *G06F 16/176* (2019.01); *G06F 16/3344* (2019.01);
(Continued)

(58) Field of Classification Search
CPC ........ G06F 17/24; G06F 17/25; G06F 17/212; G06F 17/2705; G06F 17/2765; G06F 17/30165; G06F 17/30684; G06F 17/30722; G06T 11/60; A63F 2300/5553; A63F 2300/6623; G06K 9/00442; H04L 67/306
USPC ................................ 715/201, 202, 230, 255
See application file for complete search history.

(56) References Cited

U.S. PATENT DOCUMENTS 6,353,824 B1    3/2002    Boguraev et al.
8,054,496 B1    11/2011    Rehfeld
(Continued)

OTHER PUBLICATIONS

Carter, et al., "Generating a Document Preview", U.S. Appl. No. 14/515,137, filed Oct. 15, 2014.
List of IBM Patents or Patent Applications Treated as Related.

*Primary Examiner* — Kavita Stanley
*Assistant Examiner* — Jenq-Kang Chu
(74) *Attorney, Agent, or Firm* — Jay Wahlquist

(57) ABSTRACT

A system and computer implemented method for managing a workload in an environment is disclosed. The method may include establishing a set of criteria for providing a document preview, wherein the set of criteria includes a predetermined qualitative user-input feature. The method may also include detecting a first criterion of the set of criteria using a content recognition system configured to analyze user-generated data associated with the document. The first criterion may be correlated with a portion of the document. The method may also include generating, based on the first criterion, a document preview for the portion of the document. The method may also include presenting, in response to a triggering event for a display preview, the document preview.

14 Claims, 4 Drawing Sheets

(51) Int. Cl.
*G06F 40/279* (2020.01)
*G06F 16/33* (2019.01)
*G06K 9/00* (2006.01)
*H04L 29/08* (2006.01)

(52) U.S. Cl.
CPC ............ *G06F 16/38* (2019.01); *G06F 40/166* (2020.01); *G06F 40/205* (2020.01); *G06F 40/279* (2020.01); *G06K 9/00442* (2013.01); *H04L 67/306* (2013.01)

(56) References Cited

U.S. PATENT DOCUMENTS

| | | | |
|---|---|---|---|
| 8,321,505 B1 | 11/2012 | Albani et al. | |
| 8,384,942 B1 | 2/2013 | Shmunis et al. | |
| 2005/0145702 A1 | 7/2005 | Liu et al. | |
| 2007/0291297 A1 | 12/2007 | Harmon et al. | |
| 2009/0254529 A1* | 10/2009 | Goldentouch | G06F 17/241 |
| 2011/0107204 A1* | 5/2011 | Cohen | G06F 17/211 |
| | | | 715/243 |
| 2011/0219000 A1* | 9/2011 | Kusumura | G06F 17/30687 |
| | | | 707/737 |
| 2011/0320423 A1* | 12/2011 | Gemmell | G06F 17/30867 |
| | | | 707/706 |
| 2012/0059822 A1* | 3/2012 | Malandain | G06F 17/30616 |
| | | | 707/736 |
| 2012/0173993 A1 | 7/2012 | Chakra et al. | |
| 2013/0191711 A1* | 7/2013 | Tashman | G06F 17/211 |
| | | | 715/205 |
| 2015/0195330 A1* | 7/2015 | Lee | H04L 67/02 |
| | | | 709/204 |

\* cited by examiner

GENERATING A DOCUMENT PREVIEW

BACKGROUND

The present disclosure relates to computer systems, and more specifically, to generating a document preview.

Modern computer systems can use document previews to show a user a portion of a document without requiring that the document be opened. Document previews can be viewed within a variety of contexts. Information regarding the context of a document can be used to generate a context-relevant document preview.

SUMMARY

Aspects of the present disclosure, in certain embodiments, are directed toward a system and method for providing a document preview for a document. In certain embodiments, the method may include establishing a set of criteria for providing a document preview, wherein the set of criteria includes a predetermined qualitative user-input feature. In certain embodiments, the method may include detecting a first criterion of the set of criteria using a content recognition system configured to analyze user-generated data associated with the document, wherein the first criterion is correlated with a portion of the document. In certain embodiments, the method may include generating, based on the first criterion, a document preview for the portion of the document. In certain embodiments, the method may include presenting, in response to a triggering event for a display preview, the document preview.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
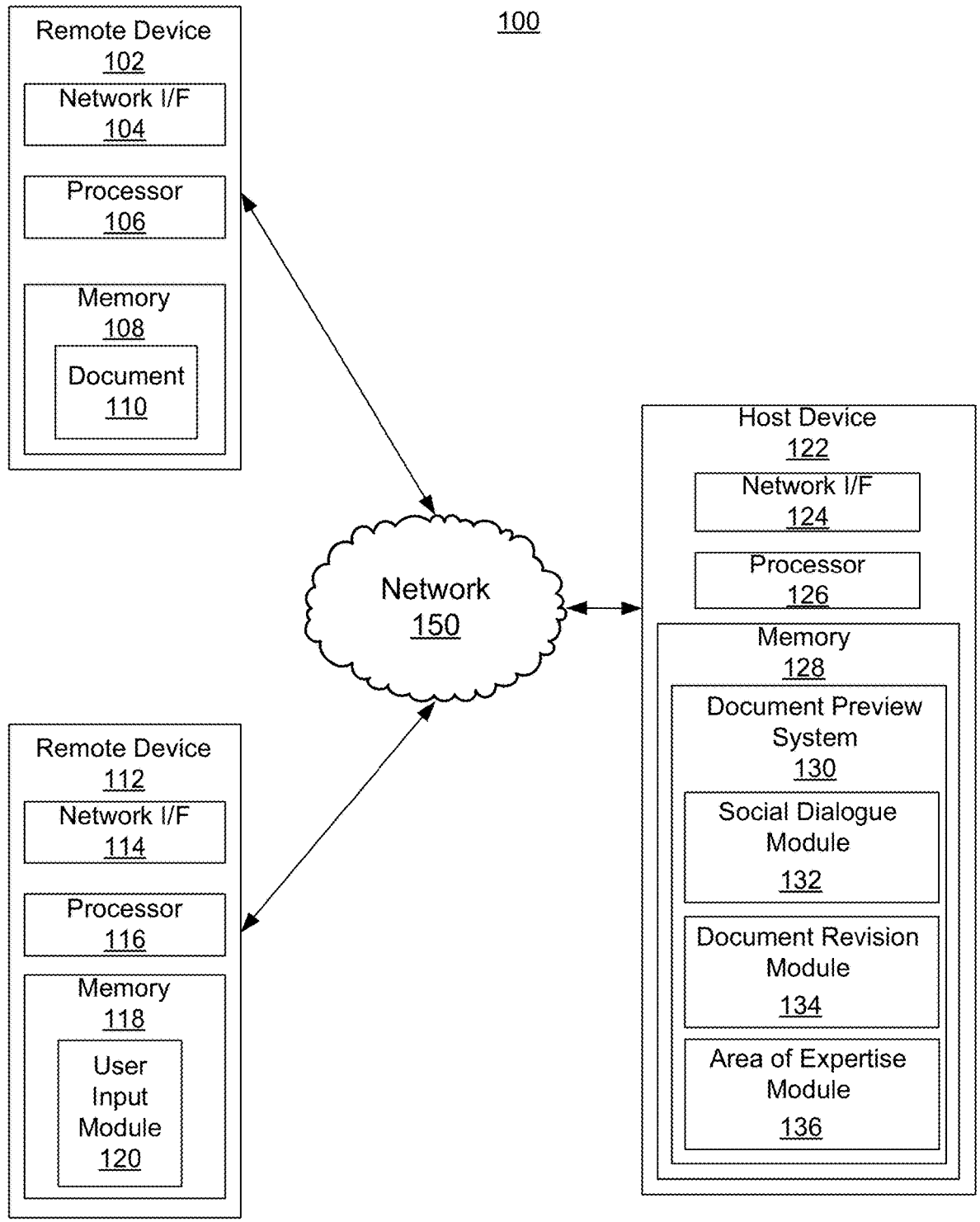
FIG. 1 is a diagrammatic illustration of an example computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for presenting a document preview. More particular aspects relate to generating a document preview for a portion of the document based on a criterion detected by a content recognition system. The method may include establishing a set of criteria for providing a document preview. The set of criteria may include a predetermined qualitative user-input feature. The method may also include detecting a first criterion of the set of criteria using a content recognition system configured to analyze user generated data associated with the document. The first criterion may be correlated with a portion of the document. The method may also include generating, based on the first criterion, a document preview for the portion of the document. In response to a triggering event for a display preview, the method may include presenting the document preview.

When using a computer system, it is often desirable to see a preview of a document. A document preview is a read-only rendering of a document that displays what a user would have seen if the document was opened with an application program associated with the document. Often, document preview systems provide a preview displaying a first page or section (e.g., portion) of a document. Aspects of the present disclosure relate to the recognition that, in certain situations, it may be desirable for a user to view a section of the document that would quickly provide them insight into the content of the document that is relevant to them individually or to the social context and interactions associated with the document. Accordingly, aspects of the present disclosure relate to a system and method for providing a document preview of a portion of the document that is determined to be relevant to the social context. The portion of the document can be selected using on one or more criteria based on user-generated content coupled with the document. Aspects of the present disclosure may provide benefits associated with time saving, efficiency, and relevancy.

Aspects of the present disclosure include a method and system for presenting a document preview. More particular aspects relate to generating a document preview for a portion of the document based on a criterion detected by a content recognition system. The method and system may work on a number of devices and operating systems. Aspects of the present disclosure include establishing a set of criteria for providing a document preview, wherein the set of criteria includes a predetermined qualitative user-input feature. The predetermined qualitative user-input feature may include one or more of a set of factors supplemental to the content of the document and defined based on a relationship between an intended audience for the document and a subject field of the document. The predetermined qualitative user-input feature may include one or more of a set of factors based on a subjective evaluation of the quality and substantiveness (e.g., how substantial) of textual content. The predetermined qualitative user-input feature may include one or more of a set of factors defined at least partially by user-generated data configured to be accessible to the content recognition system. As an example, the first criterion (e.g., the predetermined qualitative user-input feature) may one or more selected from a group consisting of a document revision, social dialogue, or area of expertise of a view of the first document. In certain embodiments, the content recognition system can be configured to use a natural language processing algorithm to parse textual content associated with the document revision, social dialogue, or area of expertise of a user to establish the set of criteria.

Aspects of the present disclosure include detecting the first criterion using a content recognition system configured to analyze user generated data associated with the document. The first criterion may be correlated with a portion of the document. In certain embodiments, the first criterion may be a document revision of the document. The document revision may include an amendment to a portion of the document. Accordingly, in certain embodiments, detecting the first criterion may include analyzing, by the content recognition system, an edit history log of the document. Detecting the first criterion may also include selecting, based on the edit history log, a first portion of the document as the document preview, wherein the first portion of the document has a revision count higher than a revision threshold value.

In certain embodiments, the first criterion may be a social dialogue coupled to the document. The social dialogue may include a conversation thread having a plurality of comments. Accordingly, in certain embodiments, detecting the first criterion may include analyzing, by the content recognition system using a natural language processing algorithm, the social dialogue coupled with the document. Detecting the first criterion may also include identifying a second portion of the document referenced within the social dialogue. In response to identifying a second portion of the document referenced within the social dialogue, detecting the first criterion may include selecting the second portion as the document preview. In certain embodiments, the second portion of the document may have a reference threshold higher than a reference threshold value within the social dialogue. In certain embodiments, the method may include identifying a third portion of the document referenced within the social dialogue. The method may include determining that the third portion of the document has a reference frequency higher than a reference frequency value within the social dialogue. The method may also include changing the document preview from the second portion of the document to the third portion of the document.

In certain embodiments, the first criterion may be an area of expertise of a viewer. For example, the area of expertise may include an academic discipline, area of concentration, knowledge field, or acquired proficiency. Accordingly, in certain embodiments, detecting the first criterion may include analyzing, by the content recognition system, a first user profile of a first user. Based on the first user profile, the method may include identifying a first area of expertise. In response to identifying the first area of expertise, the method may include selecting a third portion of the document corresponding to the first area of expertise. In certain embodiments, identifying the first area of expertise can include examining, by the content recognition system, profile metadata of the first user profile. The method can then include comparing the profile metadata with document metadata coupled with the document. The method may then include determining, in response to comparing the profile metadata with the document metadata, that the profile data and document metadata have a relevance value above a relevance value threshold.

In certain embodiments, the method may include analyzing, by the content recognition system, a second user profile of a second user. The method may include identifying, based on the second user profile, a second area of expertise. In response to identifying the second area of expertise, the method may include selecting a fourth portion of the document corresponding to the second area of expertise. The method may then include generating a third document preview for the third portion of the document. The method may also generate a fourth document preview for the fourth portion of the document. The method may then include presenting, during substantially the same time period, the third document preview to the first user and the fourth document preview to the second user.

Turning now to the figures, FIG. 1 is a diagrammatic illustration of an example computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a document preview system 130 having social dialogue module 132, a document revision module 134, and an area of expertise module 136. In certain embodiments, the document preview system 130 may be implemented using one or more of a number of computer-implemented tools, such as a natural language processing algorithm and a content recognition system. The document preview system 130 may be configured to receive documents and user-generated data from remote devices 102, 112.

In certain embodiments, the remote devices 102, 112 may be configured to transmit data (e.g., documents, user-generated content) to host device 12. For example, the remote devices 102 may include a document 110 (e.g., a document created in a word processing program, presentation program, spreadsheet program, or other sort of document). The document may be configured to be shared or transmitted to the document preview system 130 of the host device 122. Additionally, remote device 112 may include a user input module 120 configured to allow a user to submit user generated content (e.g., revisions to a document, user profile data, social dialogue comments) to the document preview system 130. For example, the remote device 112 may present a graphical user (e.g., GUI, etc.) or other interface (e.g., command line prompts, menu screens, etc.) configured to accept user input.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the document preview module may include one or more additional modules or units to perform the various functions of present disclosure embodiments described below (e.g., establishing a set of criterion, detecting a first criterion of the set of criteria using a content recognition system, generating a document preview based on the first criterion, and presenting the document preview in response to a triggering event for a display preview), and may be implemented by any combination of any quantity of software and/or hardware modules or units.

Figure 2:
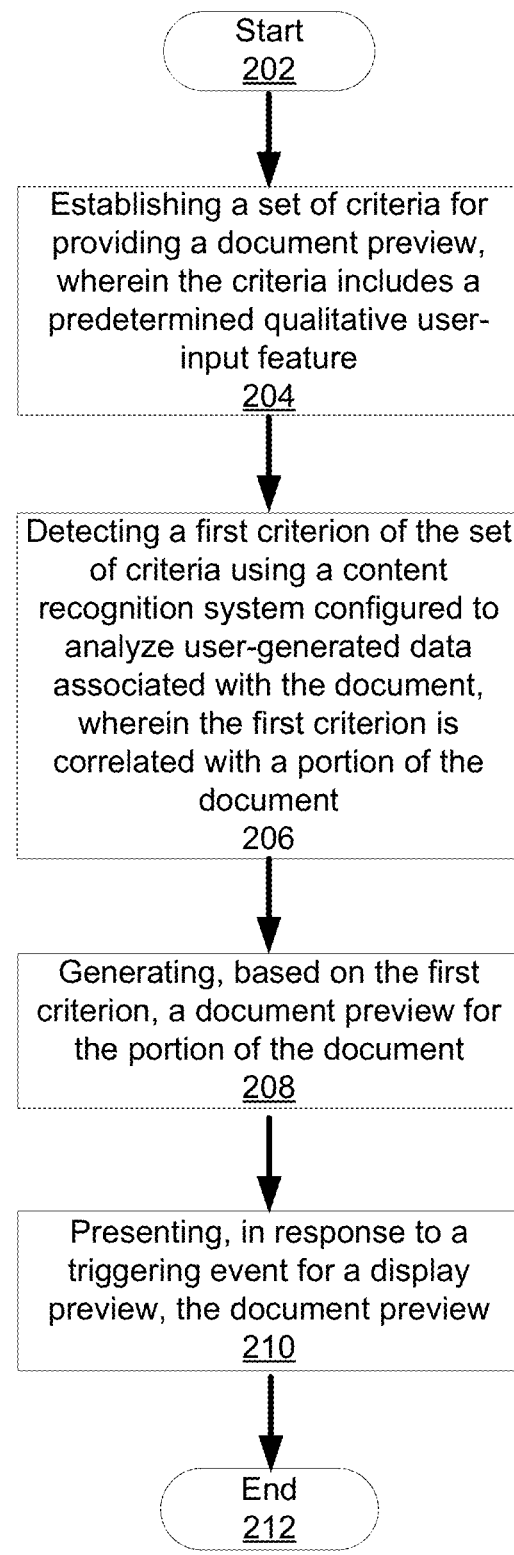
FIG. 2 is a flowchart illustrating a method for generating a document preview, according to embodiments.

FIG. 2 is a flowchart illustrating a method 200 for generating a document preview, consistent with embodiments of the present disclosure. Aspects of FIG. 2 are directed toward a method 200 for generating a document preview using a content recognition system and based on a first criterion. The method 200 may begin at block 202. Consistent with various embodiments, the method can include an establishing block 204, a detecting block 206, a generating block 408, and a presenting block 210. The method 200 may end at block 212.

Consistent with various embodiments, at block 204 the method 200 can include establishing a set of criteria for providing a document preview for a document, wherein the set of criteria includes a predetermined qualitative user-input feature. In certain embodiments, the document may be a document created in a word processing application, a presentation or slideshow application, a spreadsheet application, or other computer program. The document may be hosted on a community server (e.g., host device 122 of FIG. 1) that is accessible by one or more individuals, groups, or organizations. In certain embodiments, the document may be submitted to the community server by a remote source device (e.g., remote device 102, 112), such as a computer, tablet, smart phone, or the like. The document may be configured to register feedback and input from the individuals, groups or organizations. As an example, in certain embodiments, the document may be a slideshow presentation for an upcoming business presentation. Individuals may view the document, and write comments, and suggest revisions to the slideshow.

Aspects of block 204 of the method 200 are directed toward establishing a set of criteria. The criteria may be a feature used to determine a portion of a document to be presented as a document preview. Consistent with various embodiments, establishing the set of criteria for providing a document preview can be implemented in one of a number of ways. In certain embodiments, establishing the set of criteria can include selecting one or more predetermined criteria from a list. For example, a list of predetermined criteria may be stored on a remote server accessible by the document preview system (e.g. the document preview system 130 of FIG. 1.) Aspects of the present disclosure, in certain embodiments, are directed toward selecting a set of criteria at least including document revision, a social dialogue, or an area of expertise of a viewer. In certain embodiments, the criteria may be selected based on the file format of the document, the subject matter of the document (e.g., the topic, theme, subject or discipline), or the intended audience of the document. In certain embodiments, the criteria may be selected based on a relationship between the subject matter of the document and the intended audience of the document. As an example, for an interdisciplinary research paper that will be reviewed by a physicist, a chemist, and a geologist, a criterion of "area of expertise" may be selected to be included in the set of criteria (e.g., accordingly, each viewer could be presented with a document preview based on their area of expertise, as described herein). Other criteria and methods of selecting the criteria are also possible.

Consistent with various embodiments, each criterion of the set of criteria (e.g., document revision, social dialogue, or area of expertise) may be a predetermined qualitative user input feature. Put differently, each criterion may be configured to facilitate user-generated data submission based on a subjective evaluation of the quality and substantiveness (e.g., how substantial) of textual content. As an example, consider a scenario wherein the criterion is a social dialogue. Consistent with various embodiments of the present disclosure, the social dialogue may include a public discussion (e.g., a thread) in which multiple users can submit message posts. In certain embodiments, the social dialogue may be coupled to a document. The social dialogue may, in certain embodiments, be directed toward a particular topic or subject related to the document. For example, the social dialogue may be directed toward suggestions and critiques of the document, and users who have read the document may provide input and feedback in the form of written comments posted in the public discussion thread.

Consistent with various embodiments, at block 206 the method 200 may include detecting a first criterion of the set of criteria using a content recognition system configured to analyze user-generated data associated with the document, wherein the first criterion is correlated with a portion of the document. As described herein, in certain embodiments the first criterion may be selected from the set of criteria including a document revision, a social dialogue, or area of expertise. In certain embodiments, only one of these criteria may be available for a particular document. For example, a document may be coupled with a social dialogue, but not have any available document revision or area of expertise information. Accordingly, in such a situation, the available criterion may be detected and selected as the first criterion.

In certain embodiments, multiple criteria may be available for a particular document. For example, a particular document may be linked with a discussion page hosting a social dialogue, and also be tagged with revision notes. In such a situation, the content recognition system may be configured to use a natural language processing technique configured to parse textual content associated with the document revision, social dialogue, or area of expertise of a user in order to detect the first criterion that would be most appropriate for generation of the document preview. Additionally, the content recognition system may also be configured to generate multiple document previews for different users (e.g., viewers) of the document (as discussed later herein).

In certain embodiments, the natural language processing technique may be a software tool, widget, or other program configured to detect the first criterion. More particularly, the natural language processing technique can be configured to parse a semantic feature and a syntactic feature of the available criteria. The natural language processing technique can be configured to recognize keywords, contextual information, and metadata tags associated with the available criteria. In certain embodiments, the natural language processing technique can be configured to analyze summary information, keywords, figure captions, and text descriptions included in the criteria, and use syntactic and semantic elements present in this information to determine the first criterion. The syntactic and semantic elements can include information such as word frequency, word meanings, text font, italics, hyperlinks, proper names, noun phrases, parts-of-speech, and the context of surrounding words. Other syntactic and semantic elements are also possible. Based on the analyzed metadata, contextual information, syntactic and semantic elements, and other data, the natural language processing technique can be configured to determine which criterion is appropriate for generating the document preview for a particular document.

In certain embodiments, the first criterion may be determined to be a document revision of the document. The document revision may, for example, be a set of comments, changes, or amendments made to one or more portions of the document. A portion of the document may be a particular page, paragraph, sentence, slide, column, row, graph, table or other division of the document. In certain embodiments, detecting the first criterion (e.g., the document revision) may include analyzing, by the content recognition system, an edit history log of the document. In certain embodiments, the edit history log may be a record of revisions, corrections, and other changes made to the document. The edit history log may display edits for each portion of the document, along with a count of the number of times a particular portion has been edited. In certain embodiments, the edit history log may be appended to the document itself. In certain embodiments, the edit history log may be stored on a remote server accessible to the content recognition device. As described herein, the content recognition system may include using a natural language processing technique. The content recognition system may be configured to analyze the edit history log, and select a particular portion (e.g., a first portion) of the document to use as a document preview for the document. In certain embodiments, the content recognition system may be configured to select a portion of the document that has a revision count higher than a revision threshold value to use as the document preview. As an example, in certain embodiments, the revision threshold value may be 16. Accordingly, a portion of the document have a revision count of 19 may be selected for use as the document preview. Such a configuration allow users quickly see the portion of the document modified most frequently, which may provide benefits for individuals who are collaborating to revise a document.

Aspects of the present disclosure, in certain embodiments, are directed toward the recognition that there may, in certain situations, be multiple portions of the document with a revision count higher than a revision threshold value. Accordingly, in certain embodiments, the method 200 may be configured to determine a second criterion of the set of criteria to be used instead of or in conjunction with the first criterion. As an example, the method 200 could search for a social dialogue coupled with the document, or a user profile of a viewer of the document to identify another criteria that could be used to select a portion of the document for preview.

In certain embodiments, the first criterion may be determined to be a social dialogue coupled to the document. The social dialogue may include a public discussion or a conversation thread having a plurality of comments. In certain embodiments, detecting the first criterion (e.g., the social dialogue) may include analyzing, by the content recognition system, the social dialogue coupled with the document. Consistent with embodiments of the present disclosure, the content recognition system use a natural language processing technique configured to parse each comment of the conversation thread. The natural language processing technique may be configured to identify a portion (e.g., a particular page, paragraph, slide, graph, figure) of the document referenced within a comment of the social dialogue. As an example, a particular comment in the social dialogue may read "Graph 11 illustrates the angular intensity distribution of 660 nanometer light incident upon a colloidal liquid." Accordingly, the natural language processing technique may be configured to identify that "Graph 11" is the portion of the document referenced within this comment. In response to identifying the portion of the document referenced in the social dialogue, the method 200 can include selecting "Graph 11" as the portion of the document to be used for the document preview. Such a configuration may provide benefits associated with allowing users to quickly see the portion of the document being discussed.

Additionally, in certain embodiments, the content recognition system may be configured to select a portion of the document having a reference value greater than a reference threshold. The reference value may indicate the number of times a particular portion of the document has been referenced within the social dialogue, and the reference threshold may be the minimum reference value necessary for a particular portion of the document to be selected as the document preview. In certain embodiments, the content recognition system may only count one reference for each comment that mentions a particular document portion (e.g., a single comment making multiple references to the same document portion would only be counted as one reference.) In certain embodiments, the content recognition system may count each reference to a portion of the document, even multiple references within a single comment. In certain embodiments, reference threshold may be determined by a user. For example, a user may be able to access a settings interface and enter a numerical value for the reference threshold. In certain embodiments, the reference threshold may be calculated based on the total number of comments posted in the social dialogue. For a social dialogue with a substantially large number of comments, the reference threshold may be higher than for a social dialogue with a relatively few number of comments. As an example, consider a social dialogue with a total of 113 comments. The reference threshold for this social dialogue may be determined to be 14. Accordingly, if a particular portion of the document is referenced 14 or more times, it may be selected as the document preview. For another social dialogue with a total of 33 comments, the reference threshold may be determined to be 4.

Additionally, the content recognition system may be configured to update the document preview based on the flow of the conversation in the social dialogue. For example, after having generated a document preview based on a second portion of the document, the content recognition system may continue to analyze the social document and monitor for changes in the frequency of references to portions of the document. More specifically, the content recognition system can include identifying a third portion of the document referenced within the social dialogue. The content recognition system may determine that the third portion of the document has a reference frequency higher than a reference frequency value, and change the document preview from the second portion of the document to the third portion of the document. The reference frequency may represent the number of instances that a particular portion of the document has been referenced per a given time period. In certain embodiments, the reference frequency may represent the number of instances that a particular portion of the document has been referenced per individual comment, or per a given number of comments.

Consider the following example. The content recognition system may analyze a social dialogue coupled with a document. The social dialogue may have a total of 87 comments, a reference value of 17, and a reference frequency value of 5 instances per 7 comments. The content recognition system may identify that "page 11" of the document has been referenced in 3 individual comments, and initially select "page 11" as the document preview. As the conversation in the social dialogue continues, "page 44" may be referenced 6 times over the course of the next 7 comments. Accordingly, the document preview may be changed from "page 11" to "page 44" of the document.

In certain embodiments, the first criterion may be determined to be an area of expertise of a viewer. The area of expertise of a viewer may be an academic discipline, area of concentration, knowledge field, acquired proficiency, or other area of experience. In certain embodiments, detecting the first criterion (e.g., the area of expertise of a viewer) may include analyzing, by the content recognition system, a first user profile of a first user. In certain embodiments, the first user may be a user who has posted a comment in a social dialogue coupled to the document, or made a revision to the document. The first user profile may be stored on a remote server accessible to the content recognition system. The first user profile may be a social media site profile, professional networking site profile, employment profile, or other collection of data including user information. The content recognition system may be configured to parse information in the first user profile to identify the first area of expertise. In response to identifying the first area of expertise, the content recognition system may be configured to select a portion of the document corresponding to the first area of expertise. More specifically, the content recognition system may be configured to examine profile metadata of the first user profile. The content recognition system may compare the profile data with document metadata coupled with the document. The profile metadata may include keywords, tags, text descriptions, semantic elements and syntactic elements that indicate a particular area of experience or focus. In response to comparing the profile metadata and the document metadata, the content recognition system may determine that the profile data and the document metadata have a relevance value above a relevance value threshold. The relevance value may be a numerical value indicating a degree of similarity between the profile metadata and the document metadata as determined by the content recognition system. The relevance value threshold may be a relevance value that, when exceeded, indicates sufficient relevance for the corresponding portion of the document to be selected as the document preview.

Consider the following example. The content recognition system may analyze the first user profile of the first user and, based on metadata present in the first user profile, determine a first area of expertise of "condensed matter physics." Accordingly, the content recognition system may then be configured to compare the first area of expertise identified from the first user profile with metadata coupled with the document to locate a portion of the document that corresponds with the area of expertise of "condensed matter physics." In certain embodiments, the content recognition system may determine that page 84 of a given document discusses the Fermi liquid theory (e.g., a key theoretical model of condensed matter physics). In response, the content recognition system may select page 84 of the document as the document preview.

Additionally, certain aspects of the present disclosure are directed toward selecting multiple portions of the document, and providing a personalized document preview depending on the viewer. In certain embodiments, the personalized document preview for each user based on information available in a user profile for each user. The content recognition system may be configured to analyze both a first user profile of a first user and a second user profile of a second user, and identify a first area of expertise for the first user and a second area of expertise for the second user. For example, the content recognition system may determine that a first user has an area of expertise of "software engineering" and that the second user has an area of expertise of "network administration and security." Accordingly, the content recognition system may identify that page 19 of the document discusses programming languages, and page 61 of the document discusses preventing malicious network attacks. When the first user accesses the document preview, the method 200 may include verifying the identity of the first user (e.g., via a log-in dialogue box), and providing page 19 of the document as the document preview. Similarly, when the second user accesses the document preview, the method 200 may verify the identity of the second user, and provide page 61 as the document preview.

Consistent with various embodiments, at block 208 the method 200 may include generating, based on the first criterion, a document preview for the portion of the document. The document preview may be an image of the portion of the document selected at block 206. In certain embodiments, the document preview may be a thumbnail image, or other scaled-down version of the portion of the document selected at block 206. Consistent with various embodiments, generating the document preview may include processing the selected portion of the document, decreasing its dimensions or relative size, performing image-sharpening techniques, magnifying a specific area of interest of the selected portion of the document, or one or more other tasks to facilitate visibility and readability of the portion of the document.

Consistent with various embodiments, at block 210 the method 200 may include presenting, in response to a triggering event for a display preview, the document preview. In certain embodiments, presenting the document preview may include displaying the document preview in a window or pane of an application running on a computer. The document preview may be presented as a thumbnail image, video clip, or other means of displaying the portion of the document selected at block 208. As describe herein, the document preview may be presented in response to a triggering event for a display preview. In certain embodiments, the triggering event for the display preview may include a cursor hover, file selection, or related category selection. As an example, a user may move a cursor over the file of a document, and the document preview may be displayed as a thumbnail image. In certain embodiments, the document preview may be displayed in response to a user clicking on a folder or organizational division containing the document, or clicking a header or category related to the document. In certain embodiments, the document preview may be displayed in response to a user moving clicking on the file of the document itself.

Figure 3:
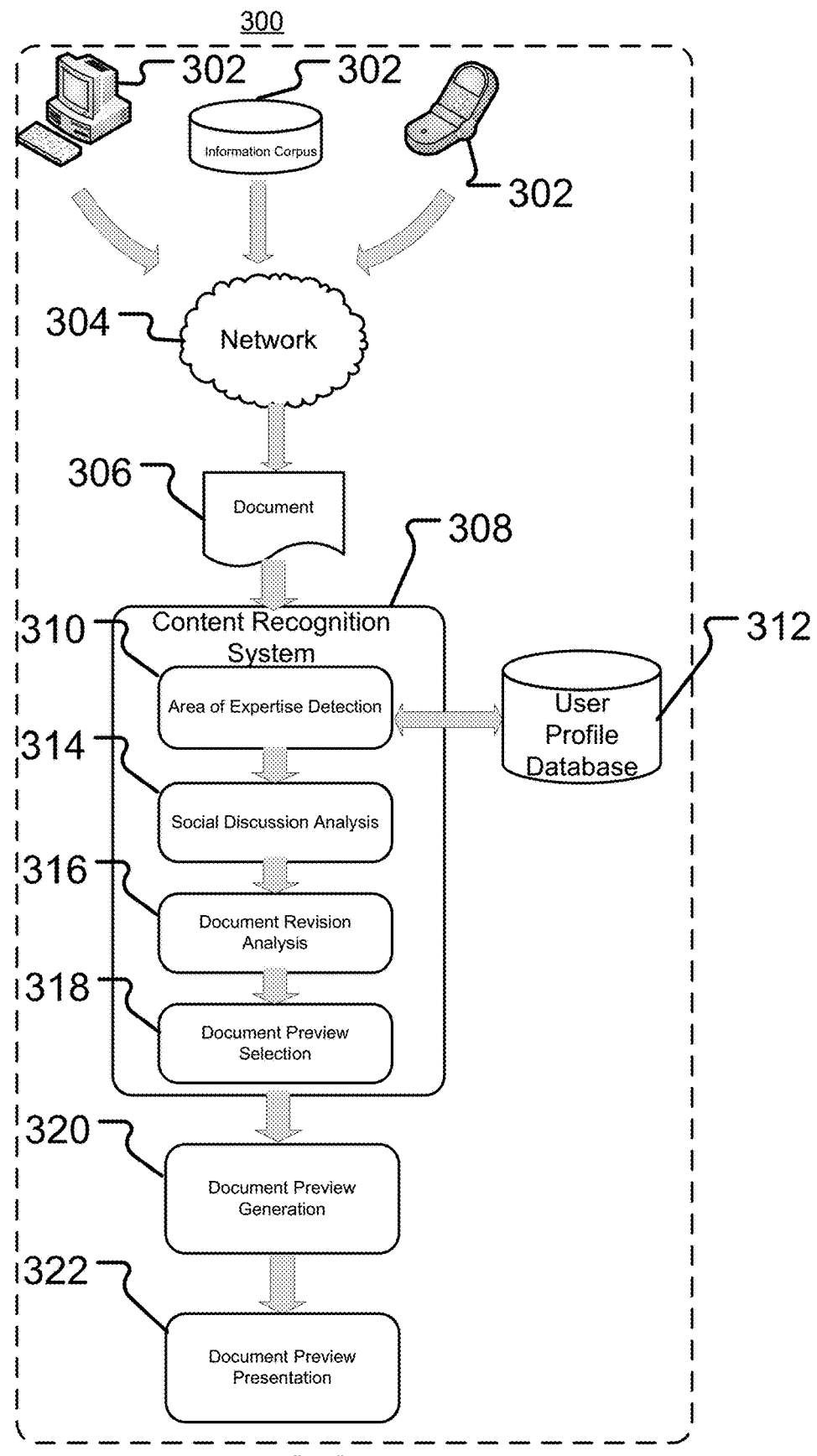
FIG. 3 depicts a high-level flow diagram for a system 300 for generating a document preview, according to embodiments.

FIG. 3 depicts a high-level flow diagram for a system 300 for generating a document preview, consistent with embodiments of the present disclosure. Aspects of FIG. 3 are directed toward providing a document preview using a content recognition system configured to determine at least one criterion. The system 300 may include using one or more source devices 302, a network 304, document 306, content recognition system 308, user profile database 312, document preview generation module 320, and document preview presentation module 322.

Consistent with various embodiments, the system 300 may include one or more source devices 302. The source devices 302 may include, but are not limited to, computers, databases, smartphones, tablets, and other devices. In certain embodiments, the source devices 302 may be communicatively connected to a network (e.g., the Internet, LAN, WAN, or other type of network) 304. The source devices 302 may, in certain embodiments, be configured to provide a document 306 to the content recognition system 308. The document 306 may include a file created in a word processing application, slideshow application, spreadsheet application, or a variety of other software tools.

In certain embodiments, the content recognition system 308 may include an area of expertise detection module 310, a social discussion analysis module 314, a document revision analysis module 316, and a document preview selection module 318. In certain embodiments, the content recognition system may be configured to utilize the area of expertise detection module 310, the social discussion analysis module 314, and the document revision analysis module 316 in a sequential order, and identify a plurality of criteria for the document preview. In certain embodiments, the content recognition system 308 may generate different document previews for different users. Although FIG. 3 depicts the area of expertise detection module 310, the social discussion analysis module 314, and the document revision analysis module 316 in the listed order, other orders are also possible.

As described herein, in certain embodiments the area of expertise detection module 310 may be configured to access a user profile database 312 to analyze a first user profile of a user. The user profile database 312 may be a remote server or corpus of user information configured to be accessible by the content recognition system 308. The area of expertise detection module 310 may use a natural language processing technique configured to recognize keywords, contextual information, and metadata associated with first user profile, and compare this information with keywords, contextual information, and metadata of the document 306. Based on the comparison, the area of expertise detection module 310 can determine a portion of the document 306 that is relevant to an area of expertise of a first user (e.g., a viewer of the document.)

In certain embodiments, the social discussion analysis module 314 may be configured to analyze comments or messages posted in a social dialogue. The social discussion analysis module 314 may identify references made to a particular portion (e.g., page, paragraph, line, figure, image caption, slide) of the document 306, and select the referenced portion as the document preview. In certain embodiments, the social discussion analysis module 314 may be configured to update the document preview based on the flow of the conversation of the social dialogue. For example, as the conversation shifts from discussing a particular portion of the document 306 to another, the social discussion analysis module 314 may detect the change and update the document preview to the portion of the document 306 currently being discussed.

In certain embodiments, the document revision analysis module 318 may be configured to analyze an edit history log of the document 306. The edit history log may be a record of revisions, corrections, and other changes made to the document. The edit history log may display edits for each portion of the document, along with a count of the number of times a particular portion has been edited. In certain embodiments, the edit history log may be appended to the document itself. In certain embodiments, the edit history log may be stored on a remote server accessible to the content recognition device.

In certain embodiments, the document preview selection module 318 may be configured to select a portion of the document to be used as the document preview based on the output of the area of expertise detection module 310, social discussion analysis module 314, and document revision analysis module 318. The document preview generation module 320 may then be configured to process the portion of the document selected by the document preview selection module 318, and prepare it for presentation. Accordingly, the document preview presentation module 322 may present the document preview in response to a triggering event for a display preview. In certain embodiments, the triggering event for the display preview may include a cursor hover, file selection, or related category selection.

Aspects of the present disclosure relate to the recognition that, in certain embodiments, multiple criteria may be available for the document 306. For example, the document 306 may have an appended revision history of edits and changes, and also be coupled with a public discussion page including comments regarding the document 306. Accordingly, in certain embodiments, the content recognition system 308 can include analyzing both the revision history as well as the public discussion comments. The document preview selection module 318 may select both a first portion of the document based on the revision history, and a second portion of the document based on the public discussion comments. In certain embodiments, the document preview generation module 320 may generate a document preview for both the first portion of the document and the second portion of the document, and the document preview presentation module 322 may present both previews to users of the document. Alternately, the document preview presentation module 322 may display only one of the document previews, based on factors such as screen size, resolution, readability, or other heuristic features. Although the present example describes document preview generation for the case of two available criteria, generating document previews for greater or fewer available criteria are also possible.

Although various aspects of the present disclosure were discussed with regard to text-based documents, other configurations using sound files, video files, or other sorts of media are also contemplated.

Figure 4:
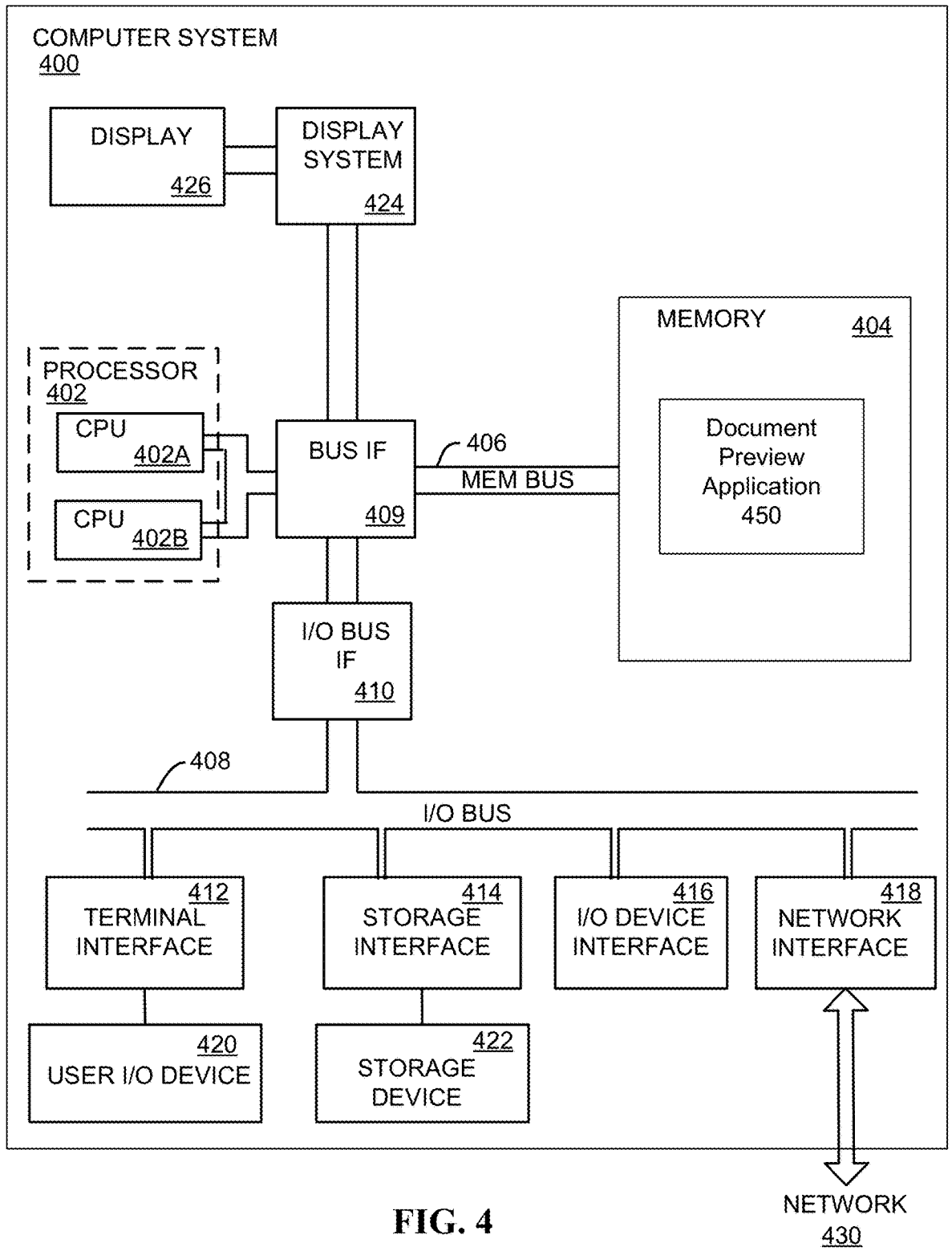
FIG. 4 depicts a high-level block diagram of a computer system for implementing various embodiments, according to embodiments.

FIG. 4 depicts a high-level block diagram of a computer system 400 for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, or storage medium (either volatile or non-volatile) for storing or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store a document preview application 450. In embodiments, the document preview application 450 may include instructions or statements that execute on the processor 402 or instructions or statements that are interpreted by instructions or statements that execute on the processor 402 to carry out the functions as further described below. In certain embodiments, the document preview application 450 is implemented in hardware via semiconductor devices, chips, logical gates, circuits, circuit cards, and/or other physical hardware devices in lieu of, or in addition to, a processor-based system. In embodiments, the document preview application 450 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 710 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts several major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for providing a document preview for a document, the method comprising:
   receiving the document, wherein the document includes a first content;
   receiving data associated with the document, wherein the data associated with the document excludes the first content of the document and includes data about a first user and data about a second user;
   analyzing the data associated with the document using a content recognition system configured to use a natural language processing technique to parse syntactic and semantic elements of the data associated with the document;
   selecting, based on the analysis of the data associated with the document, a first criterion from a set of criteria for providing the document preview, wherein each criterion in the set of criteria includes a respective one or more factors for selecting a respective portion of the document;
   selecting a first portion of the first content of the document for use in a first document preview based on the respective one or more factors of the first criterion and on the analysis of the data about the first user;
   selecting a second portion of the first content of the document for use in a second document preview based on the respective one or more factors of the first criterion and on the analysis of the data about the second user;
   generating the first document preview using the selected first portion of the document;
   generating the second document preview using the selected second portion of the document;
   outputting, in response to a first triggering event for a display preview, the first document preview for display to the first user on a first display device; and
   outputting, in response to a second triggering event for a display preview, the second document preview for display to the second user on a second display device;
   wherein the first criterion, the first portion of the document, and the second portion of the document are distinct from the data associated with the document;
   wherein the first triggering event causes the first document preview to be displayed on the first display device prior to the document being opened by the first user viewing the document preview on the first display device; and
   wherein the second triggering event causes the second document preview to be displayed on the second display device prior to the document being opened by the second user viewing the document preview on the second display device.

2. The method of claim 1, wherein the first triggering event for a display preview and the second triggering event for a display preview each comprise one or more selected from a group consisting of a cursor hover, file selection, or related category selection.

3. The method of claim 1, wherein the respective one or more factors of the first criterion include one or more factors defined based on a relationship between an intended audience for the document and a subject matter of the document.

4. The method of claim 1, wherein the respective one or more factors of the first criterion include one or more factors defined based on a subjective evaluation of the quality and substantiveness of textual content.

5. The method of claim 1, wherein the respective one or more factors of the first criterion include one or more factors defined at least partially by user-generated data configured to be accessible to the content recognition system.

6. The method of claim 1, wherein the first criterion is one or more selected from a group consisting of a document revision, social dialogue, or area of expertise of a viewer of the first document.

7. The method of claim 6:
   wherein the first criterion is a document revision of the document, the document revision including an amendment to a portion of the first content of the document; and
   wherein selecting the first criterion includes:
      analyzing, by the content recognition system, an edit history log of the document, wherein the edit history log is separate from the first content of the document; and
      selecting, based on the edit history log, the first portion of the document as the first document preview, wherein the first portion of the document has a revision count higher than a revision threshold value.

8. The method of claim 6:
   wherein the first criterion is a social dialogue coupled to the document, the social dialogue including a conversation thread having a plurality of comments; and
   wherein selecting the first criterion includes:
      analyzing, by the content recognition system using the natural language processing technique, the social dialogue coupled with the document;
      identifying the first portion of the document referenced within the social dialogue; and
      selecting, in response to identifying the first portion of the document referenced within the social dialogue, the first portion as the first document preview.

9. The method of claim 8, wherein the first portion of the document has a reference frequency greater than a reference frequency value within the social dialogue.

10. The method of claim 8, further comprising:
    identifying a third portion of the document referenced within the social dialogue;
    determining that the third portion of the document has a reference frequency higher than a reference frequency value within the social dialogue; and
    changing the first document preview from the first portion of the document to the third portion of the document.

11. The method of claim 6:
    wherein the first criterion is an area of expertise, the area of expertise including an academic discipline, area of concentration, knowledge field, or acquired proficiency; and
    wherein selecting the first criterion includes:
       analyzing, by the content recognition system, a first user profile of the first user;
       identifying, based on the first user profile, a first area of expertise; and
       selecting, in response to identifying the first area of expertise, the first portion of the document corresponding to the first area of expertise.

12. The method of claim 11, wherein identifying the first area of expertise includes:
    examining, by the content recognition system, profile metadata of the first user profile;

comparing the profile metadata with document metadata coupled with the document; and determining, in response to comparing the profile metadata with the document metadata, that the profile data and document metadata have a relevance value above a relevance value threshold.

13. The method of claim 11, further comprising:

analyzing, by the content recognition system, a second user profile of the second user;

identifying, based on the second user profile, a second area of expertise; and selecting, in response to identifying the second area of expertise, the second portion of the document corresponding to the second area of expertise.

14. The method of claim 6, further comprising:

determining, by the content recognition system in response to analyzing an edit history log coupled with the document, the document revision as the first criterion of the set of criteria;

selecting, based on the first criterion and the analysis of the edit history log, the first portion of the document as the first document preview;

determining, by the content recognition system in response to analyzing a conversation thread coupled with the document, the social dialogue as a second criterion of the set of criteria;

selecting, based on the second criterion and the analysis of the conversation thread, a third portion of the document as a third document preview;

generating the third document preview using the third portion of the document;

determining, by the content recognition system in response to analyzing a first user profile of the first user, the area of expertise as a third criterion of the set of criteria;

identifying, based on the third criterion and the analysis of the first user profile, a first area of expertise corresponding with the third portion of the document; and presenting, in response to identifying the first area of expertise corresponding with the third portion of the document, the third document preview to the first user.

* * * * *